United States Patent

[11] 3,551,652

| [72] | Inventor | Rudolf Faude<br>Eatontown, N.J. |
|---|---|---|
| [21] | Appl. No. | 604,962 |
| [22] | Filed | Dec. 27, 1966 |
| [45] | Patented | Dec. 29, 1970 |
| [73] | Assignee | Hecon Corporation<br>New Shrewsbury, N.J.<br>a corporation of New Jersey |

[54] KEY-COUNTER
3 Claims, 5 Drawing Figs.

[52] U.S. Cl................................................. 235/92,
200/42
[51] Int. Cl........................................ B41l 39/02,
H01h 27/00
[50] Field of Search......................................... 235/92(27),
92(27.1), 92(56); 200/42, 43, 44, 46;
335/207; 340/357; 355/14(Inquired)

[56] References Cited
UNITED STATES PATENTS

| 3,345,603 | 10/1967 | Cohen................... | 200/44(UX) |
|---|---|---|---|
| 3,441,718 | 4/1969 | Hatherell et al. ......... | 235/92 |
| 2,850,241 | 9/1958 | Kilborn...................... | 235/92 |
| 2,855,993 | 10/1958 | Rahmel...................... | 235/92X |
| 3,133,173 | 5/1964 | Vriens........................ | 335/207 |
| 3,266,018 | 8/1966 | Higgins...................... | 340/357X |
| 3,436,530 | 4/1969 | Faude et al................ | 235/92 |

*Primary Examiner*—Maynard R. Wilbur
*Assistant Examiner*—Michael K. Wolensky
*Attorney*—Ostrolenk, Faber, Gerb and Soffen ABSTRACT: A control device and cooperating key-counter which incorporates an electronic defeating device and counter means. The control device is coupled between a power source and a machine whose use is to be prevented by unauthorized personnel. In the absence of insertion of the key-counter into the control device, a transient condition in the power line is sensed, causing the power source to be disconnected from the machine. The machine may not be placed back into operation until and unless the key-counter is inserted into the control device. A threshold detection circuit is utilized to distinguish between a selected transient condition and normal power condition to generate a pulse of sufficient length for both advancement of the counter indicating amount of use of the machine and for isolating the power source from the machine in instances where the key-counter device has not been inserted into the control device.

INVENTOR.
RUDOLF FAUDE

BY

OSTROLENK, FABER, GERB & SOFFEN
ATTORNEYS

FIG. 2.

INVENTOR.
RUDOLF FAUDE

BY
OSTROLENK, FABER, GERB & SOFFE

ATTORNEY.

KEY-COUNTER

The instant invention relates to electrical interlock devices, and more particularly to a novel electrical interlock device which prevents access to a machine or other utilization device by unauthorized personnel wherein the electronic interlock means may be coupled between the power source and the male plug of the machine or utilization device so as to require no modification whatsoever to the machine or other utilization device, while at the same time retaining all of the interlock features.

In copending application Ser. No. 537,597, filed Feb. 17, 1966 now Pat. No. 3,436,530 issued Apr. 1, 1969 and assigned to the assignee of the instant invention, there is described therein a novel key-counter which prevents use of a machine or other utilization device by unauthorized personnel. Briefly, one embodiment described therein is comprised of a counting device capable of counting the number of items produced by the machine or capable of counting the length of time during which the machine is operated by authorized personnel. The counting device is provided with means for receiving an electrical key-counter which is plugged into a socket uniquely adapted to receive the key-counter. The key-counter, as the name implies, is a combination counter and electronic key designed to defeat the machine interlock so as to allow authorized personnel to gain access to the machine. One extremely advantageous use for such an interlock system is that of copier machines wherein a plurality of departments within a company share a single machine and wherein it is highly desirable to allocate cost of the machine amongst the different departments sharing the machine. The copier machine console is provided with a counter for counting the total number of document copies produced regardless of the department employing the machine. In the absence of the insertion of a key-counter, use of the copier machine is defeated. The insertion of a key-counter defeats the interlock device, allowing the authorized personnel having possession of the key-counter to run off any number of copies desired. The key-counter plug-in device carries its own counter which accumulates a count of the total number of document copies produced whenever that particular key-counter device is plugged into the console. This arrangement makes it quite simple to allocate costs amongst various departments using a single copier machine, as well as providing a highly effective device which prohibits use of the copier machine by unauthorized personnel, thereby significantly reducing machine operating costs and waste due to nonbusiness use.

Such novel interlock devices require some modification of the copier machine, thereby making it a simpler task to include such interlock devices at the time of initial assembly of the copier machine. Since many copier machines are acquired by users on a lease basis and, therefore, are owned by the lessor, it is dependent upon the lessor's decision as to whether modification of an already installed copier machine will be allowed in order to permit the user and lessee to take advantage of the cost allocation and cost reduction features. Also, in the case where machines are acquired by outright purchase, it becomes disadvantageous and quite expensive to modify a machine to provide the unique features mentioned above.

The instant invention is characterized by providing all of the above features through the use of additional electronic circuitry which permits the interlock device to be positioned between the copier machine (or other utilization device) power cord and the local source of power, usually a 115 volt AC source commonly available through a wall outlet. This arrangement simply necessitates a plug-in operation, preferably with the addition of suitable locking means to prevent the copier machine (or other device) power cord from being directly insertable into the wall outlet.

The electronic circuitry of the interlock device utilizes the inherent characteristic of the instantaneous current surge in the device for the purpose of advancing the master and subsidiary counters while providing suitable means for preventing operation of the copier machine (or other device) unless a suitable key-counter is plugged into the unit.

The instant invention may also be suitably modified so as to be capable of being used in copier machines or other utilization devices wherein no appreciable surge current is present, or the surge current does not occur at the beginning of each operation or wherein it is desired to count units of time. For example, in a device such as a computer or a machine tool, such a device may be initially turned ON and operated in the ON state for a rather lengthy period of time. Such the operating activity is not quite the same as that of a copier machine wherein measurement of utilization is most easily determined by the number of copies prepared. In the case where such straightforward criteria is not present the key-counter device may be employed to measure elapsed operating time by counting the number of time units which occur during the operation of the device (i.e., computer). Such a device may be modified by coupling counting means such as counter means operated by a synchronous motor or a free-running multivibrator circuit which may be used to continuously pulse the counter to indicate elapsed time. The time unit may be of any desired length such as one-half second, one second, one-half minute, one minute, etc. The free-running multivibrator may be coupled into the power circuit of the machine so that it begins operating as soon as the machine is energized.

An additional capability may be provided with the control device for the purpose of counting time units of operation for the machine being controlled by the interlock device. The time unit counting device may be very advantageously used in copier machines of the type which employ either sensitized or unsensitized paper provided on large paper rolls. At present such paper rolls may be purchased from any source other than the manufacturer of the particular copier machine. There is no means provided in copier machines using long, continuous paper rolls of sensitized (or unsensitized) paper for counting the amount of paper which has been used. In copier machines using ready-cut paper sheets a counter is normally provided in the copier machine which accumulates the number of cup paper sheets utilized by the customer which count accumulated in the counter is employed for the purpose of charging the customer in accordance with the number of copies produced.

However, in machines employing long, continuous paper rolls the employment of the conventional counter would merely register the number of copies prepared independent of their size so that a copy having a length of 15 inches, for example, would develop the same count as a copy having a 5 inch length. In addition thereto, advantage can be taken of the system in its present form by feeding two documents to be copied into the copier machine at one time with a slight overlap of the documents to be copied, resulting in the production of an oversize single copy. The copy can then easily be cut into its separate parts but nevertheless would be registered as a single copy in the conventional counter means.

To solve this problem, the instant invention provides a combination of a time pulsing means with a standard electromagnetic counter. The time pulser consists of a synchronous motor and any suitable type of switch assembly such as, for example, a reed switch plus permanent magnet arrangement. The synchronous motor is connected in parallel with the scanning light of the copier machine and starts to pulse the counter in regular intervals such as one second, or any other suitable time unit, as soon as the light is energized and stops pulsing the counter as soon as the light goes off. Thus the time cycle of the light corresponds to the length of the copy produced within a suitable tolerance arrangement. The counter would therefore not record copies but would record a billing unit allowing the manufacturer and/or distributor of the copier machine to lease the machine and charge the user in accordance with the number of billing units registered which in turn is fairly accurately related to the accumulated total length of all copies made during the billing period.

Such an arrangement allows a monthly charge based on billing units to be charged by the manufacturer which, in turn, permits the manufacturer to provide the paper roll at either a very nominal fee or free of charge, thereby facilitating use of paper rollers by the copy machine user from the manufacturer and/or distributor of the copier machine. The billing unit counting device does not affect successful operation of the interlock control device and independent pickup of the synchronous motor occurs as a result of energization of the copier machine scanning light. It should be understood that the billing unit mechanism may be employed with devices other than copier machines for the purpose of accumulating time units to facilitate customer billing.

It is, therefore, one object of the instant invention to provide a novel interlock device which prohibits access to the device in the absence of insertion of an electronic "key means" capable of defeating the interlock mechanism.

Yet another object of the instant invention is to provide a novel interlock device which prohibits access to the device in the absence of insertion of an electronic "key means" capable of defeating the interlock mechanism, and wherein the interlock device may be very simply coupled to the device.

Still another object of the instant invention is to provide a novel interlock device which normally prohibits use of a machine in the absence of insertion of an electronic "key means," which device may be very simply and easily coupled to the machine, and which device is further provided with master counting means within the device and subsidiary counter means in each of the electronic key means for facilitating allocation of costs amongst the holders of each electronic "key means."

Still another object of the instant invention is to provide novel means for accumulating time units representative of the total length of machine operation which may be used in conjunction with the interlock device for facilitating customer billing per se, or on a cost-control basis.

These and other objects of the instant invention will become apparent when reading the accompanying description and drawings in which:

FIG. 1 is a schematic diagram of an interlock device designed in accordance with the principles of the instant invention;

FIG. 2 is a schematic diagram showing an alternative embodiment of the instant invention;

Figure 3:
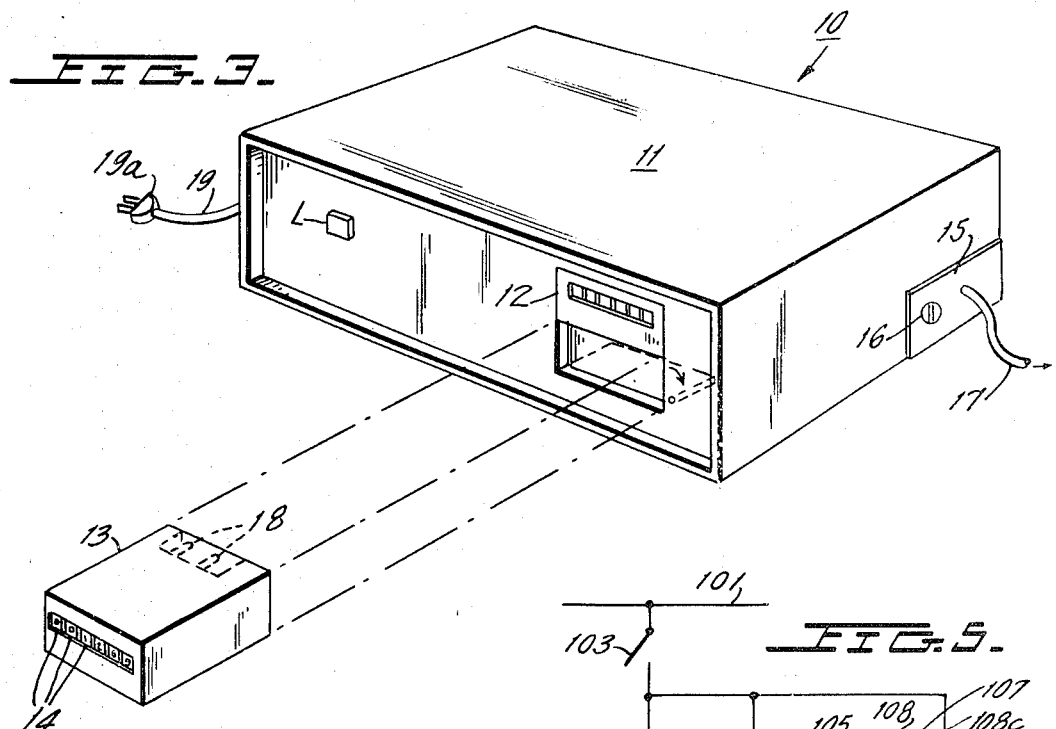
FIG. 3 is a perspective view showing the interlock circuit and a plugged-in key-counter device, and further shows the manner of connection to a machine.

Referring now to the drawings, FIG. 3 shows the copyorder device 10 designed in accordance with the principles of the instant invention and which is comprised of a substantially completely sealed housing 11 having an opening 12 in its front face for receiving a key-counter device. Housing 11 contains all of the interlock circuitry for preventing operation of the machine coupled thereto, which will be more fully described with references to FIGS. 1 and 2. The device 10 may be coupled to a suitable wall outlet by means of plug 19a which, in turn, powers the electrical circuitry through a power cord 19. The housing 11 is provided with a hinged, or otherwise removable door 15 capable of being maintained in a closed position by a suitable key-operated lock 16, for example. The interior of the housing 11 is provided with a suitable female socket (not shown) for receiving the plug of the machine being controlled by the interlock circuitry 10. The power cord 17 of the machine (not shown) being controlled provides the electrical path between the wall outlet (not shown) and the machine which, for example, may be a copier machine. The purpose of preventing access to the machine plug is to prevent the machine from being plugged directly into a wall outlet and thereby defeating the interlock device 10. It should be understood that any other suitable means of preventing removal of the copier machine plug from device 10 may be employed without a departure from the scope of the instant invention.

The opening 12 in housing 11 is designed to receive a key-counter 13, the front face of which is provided with a plurality of windows 14 behind which is positioned a counter capable, for example, of counting from 000,000 to 999,999. A suitable solenoid is provided within housing 11 for advancing the count of the counter. The key-counter 13 also houses the necessary electronic interlock means for permitting the interlock device 10 to power the copier machine.

If desired, the housing 11 may include a master counter to develop an accumulative count of all of the copies produced by the copier machine, which count should be equal to the total of the counts of each key-counter inserted into the device 10. Since most copier machines presently available on the market already includes such a master counter, the master counter may be omitted from the housing 11 since it would be performing a superfluous function.

The rear end of the key-counter device 13 is provided with a plurality of projecting conductive pins 18 which are arranged in a predetermined planar array so as to be received by similarly arranged associated holes or openings contained within an interior wall (not shown) provided within the control device 10. If desired, however, it should be obvious that the control device 10 may be provided with internally mounted projecting pins and the rear of key-counter device 13 may be provided with similarly arranged holes or openings for receiving such projecting pins. The pins 18 are recessed so as to prevent damage to the pins if the key-counter 13 is accidentally dropped. The preferential arrangement is that the interior wall within the opening 12 be provided with female sockets for receiving pins 18 so as to prevent an operator or anyone else from receiving a shock by insertion of either a finger or a metallic tool into opening 12.

The control device 10 is electrically coupled to a copier machine, computer and the like, through the power cord connection to provide the functions of inhibiting use of the machine until a key-counter 13, having the proper interlock circuitry, is inserted within the control device 10 and further provides the function of maintaining a cumulative master count (if desired) while at the same time providing a signal to advance the counter of the key-counter structure 13, The control device 10 may, for example, be attached to a copier machine to maintain a cumulative count in its (optional) totalizing counter which reflects the total number of copies run off by the copier machine. Each individual key-counter 13 may be assigned to a specific department and, when inserted into the control device 10, is caused to develop its own count reflecting the total number of copies attributed to the particular department having possession of the associated key-counter.

FIG. 1 shows the electrical circuit of one preferred embodiment of the instant invention. The dotted circle 13a encompasses the electronic circuitry provided within the key-counter device 13, while the remainder of the circuitry represents the electrical circuit provided within the control device 10. The left-hand ends of the power conductors 20 are suitably coupled to the plug 19a whereas the right-hand terminals of power conductors 20 are connected to a female plug for the purpose of receiving the plug (not shown) coupled to the copier machine power cord 17, shown in FIG. 3. Three lines 20 are provided in the case where a grounded three-terminal plug is employed in such cases, for example, where safety regulations require a ground plug connection.

The lowermost power conductor of the conductors 20 is provided with a series coupled primary winding 22 of a current transformer 23. The secondary winding 24 has its terminals coupled across two terminals 25 and 26 of a fullwave diode rectifier circuit. The remaining two terminals 27 and 28 of the fullwave diode rectifier are coupled across the end terminals of an adjustable resistance element 29 so that the entire fullwave rectified signal appears across the terminals of adjustable resistance 29.

The adjustable resistance 29 is coupled to a pulse widening circuit which is employed for the purpose of generating a pulse of sufficient duration to add a count to the key-counter device 13 each time the copier machine produces a copy. The pulse widening circuitry 30 takes advantage of the fact that a current surge in the form of a transient pulse occurs in the power line of the copier machine each time the copier machine initiates a copy producing cycle.

Figure 4:
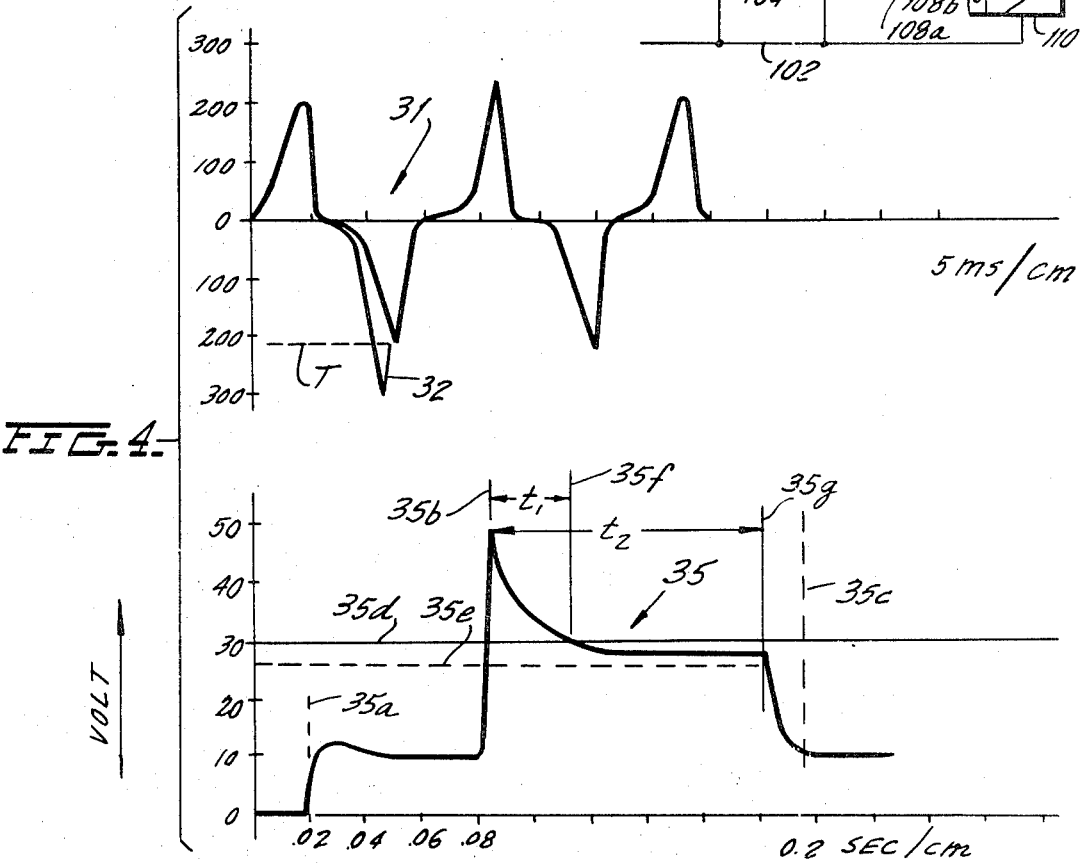
FIG. 4 shows a plurality of waveforms useful in explaining the operation of the instant invention.

FIG. 4 shows a waveform 31 indicating the transient pulses which appear in the power conductors each time a copy producing cycle is initiated. The peaking occurs, as shown at 32, as the copy producing cycle is initiated. Since this transient pulse has a duration which is insufficient to operate the key-counter 13 to add one count, the pulse widening circuitry 30 is employed.

One terminal of adjustable resistance 29 is coupled to common bus 33 whereas the other end terminal is coupled to one terminal of a resistor $R_4$. The adjustable arm $29a$ of resistance 29 is coupled to the cathode of a Zener diode $Z_D$. The anode of Zener diode $Z_D$ is directly coupled to the gate of a silicon controlled rectifier $SCR_1$ whose cathode is coupled to bus 33 and whose anode is coupled to the lower terminal of resistor $R_4$. The entire fullwave rectified signal is applied across $SCR_1$ and a portion of the entire rectified voltage is applied to the gate of $SCR_1$. Resistor 29 is made adjustable so as to determine the threshold level at which $SCR_1$ is turned ON When this threshold level T (see FIG. 4, waveform 31) is achieved, $SCR_1$ is turned ON, when the voltage level at gate G reaches a threshold value, $SCR_1$ is turned ON. Prior thereto, when $SCR_1$ is turned OFF, capacitor $C_1$ is fully charged in the steady state condition. When the threshold level is achieved the gate G of $SCR_1$ turns $SCR_1$ ON; this establishes a discharge path for capacitor $C_1$ causing the current to be divided between the parallel branches comprised of resistors $R_5$ and relay coil 34. No current flows through the path comprised of series-connected resistor $R_6$ and diode $D_1$ to the reverse polarity of diode $D_1$ relative to $SCR_1$. Resistor $R_5$ provides the minimum latching current necessary which would not otherwise be obtainable in the presence of a purely inductive load comprised of the relay solenoid 34. The discharge time of capacitor $C_1$ is of a length sufficient to enable relay coil 34 to operate its relay contacts 34—1, 34—2 and 34—3 which function in a manner to be more fully described. The branch circuit comprised of $R_6$ and $D_1$ provides a charging current path for capacitor $C_1$. When $SCR_1$ is in cutoff state the voltage appearing across the terminals of adjustable resistor 29 is applied through resistor $R_4$, capacitor $C_1$, resistor $R_6$, diode $D_1$ and common bus 33 for the purpose of charging capacitor $C_1$. When the machine is turned ON the first waveform peak which occurs due to the current surge accompanying turn ON will not operate the key-counter to add a count of one due to the required charging time for capacitor $C_1$.

The counter activating circuit 36 is comprised of a (four diode) fullwave rectifier circuit having its input terminals 37 and 38 coupled across power supply conductors 20. The output terminals 39 and 40 of the fullwave diode rectifier are coupled between conductors 41 and 42—43, respectively. A differential relay 44 has its lower pair of terminals coupled to bus 42 through resistors $R_2$ and $R_1$, respectively. One upper terminal of differential relay 44 is coupled to bus 41. The other upper terminal of differential relay 44 is coupled to a female socket 45 (mentioned previously), designed to receive one pin provided at the rear of key-counter device 13.

The solenoid 46 for pulsing the master counter or totalizer (optional) has one terminal coupled to bus 41 and another terminal coupled to a second female terminal 47, designed to receive another pin from key-counter 13, which terminals are further electrically coupled to the relay contact 47—1 of polarized relay 47 which function will be subsequently described. Relay contact 47—1 is operable between stationary contact 48 and stationary contact 49 and normally engages contact 48. When relay contact 34—1 engages stationary contact 50, and a key-counter is plugged in as shown, a current path is established for energizing solenoid 46 to advance its counter by one count in a manner to be more fully described.

The counter solenoid 46 becomes energized only when relay contact 34—1 engages stationary contact 50. The actual sequence of operation will be more fully described.

The key-counter 13 is comprised of the series connected elements $R_3$ and solenoid 51 which are comprised of a negative temperature coefficient resistance and a key-counter solenoid, respectively. Their common terminal is designed to be inserted into a female socket $51a$ provided within the interlock device 10. The opposite terminals of the negative temperature coefficient resistance $R_3$ and key-counter solenoid 51 are coupled through pins 18 (see FIG. 3) which pluggably engage the female sockets 45 and 47, respectively, to enable appropriate operation of the machine (i.e., copier machine) being controlled by interlock device 10.

Relay 52, which has one terminal coupled to conductor 41 and its opposite terminal connected to stationary contacts 53 and 54 (or 55 alone in an alternative embodiment), is so arranged that, when energized, it closes its normally open relay contact 52—1 to "latch in" from stationary contact 56 for the purpose of deenergizing the machine (copier machine) placed under the control of control device 10.

The remaining circuitry employed for the purpose of preventing unauthorized use of the machine being controlled is comprised of transformer means 57 whose primary winding 58 is coupled across the upper and lower conductors of conductor group 20 and whose secondary winding 59 is coupled across the input terminals 60 and 61 of a diode bridge fullwave rectifier. The negative output terminal 62 of the fullwave rectifier is coupled to bus 64 while the positive output terminal 63 of the diode bridge is coupled to bus 65. Bus 64 is coupled in common to the upper input terminals of a differential relay and is further coupled in common to the upper terminals of polarized relay 47. Polarized relay 47 operates relay contacts 47—1 through 47—3 and differential relay 66 operates its relay contacts 66—1 and 66—2 in a manner to be more fully described.

OPERATION (With Contact Arrangement 76 Present And Arrangement 76a Absent)

Let it be first assumed that the key-counter device 13 is not inserted into the mating female sockets in the manner shown in FIG. 3. Let it now be assumed that the machine (copier machine) has been turned ON and that a print operation has been initiated by depression of the print button upon the machine (it being clearly understood that such print buttons are typically provided in such devices).

The current surge in the conductor 20, due to the initiation of the print cycle, performs the pulse stretching operation providing a pulse of sufficient duration to cause relay 34 to become energized. In the absence of the key-counter device 13 the differential relay 44 is energized through conductor 41 and resistor $R_1$ to bus 42 causing its relay contacts 44—2 and 44—4 to engage their associated stationary contacts 68 and 53, respectively. Simultaneously therewith the above mentioned energization of relay 44 is simultaneously opens or separates its relay contacts 44—1 and 44—3 from their associated stationary contacts 69 and 70, respectively.

The energization of relay 34 causes contact closure of its contacts 34—1 and 34—2 with their associated stationary contacts 50 and 73, respectively, and establishes a conductive path from the negative terminal 62 of the fullwave rectifier through relay half $47a$ of polarized relay 47, closed contact 44—2, closed contact 34—2 and bus 65 to positive terminal 63. The energization of relay half $47a$ causes its associated relay contact 47—1 to engage stationary contact 49 and further causes contact 47—2 to engage its stationary contact 71. Closure of contact 47—1 with stationary contact 49 establishes a current path for the master counter, solenoid 46 maintaining the master counter in half-step condition and thereby preventing one count from being added to the counter while at the same time retaining this count in memory through the current path of relay contacts 47—1 and 49. Electromagnetic counters of the type described herein are normally advanced through the energization or pulsing of the counter electromagnet which causes the counter number wheel to be advanced by a half-step. The energization of the electromagnet armature also causes a spring means to become loaded or energized. Removal of the pulse or energization from the electromagnet allows the spring means to become discharged so as to advance another half-step or ultimately so as to advance the count in the counter by one. One typical counter which operates in this manner is the Hecon type FR967, manufactured by the assignee of the instant application. It should be understood, however, that any other conventional counter may be employed, there being numerous counters available which operate in this manner.

The energization of relay 44 also causes closure of the contact 44—4 with its associated stationary contact 53. This establishes a current path from bus 43 through contacts 34—3, 44—4 and relay 52 to bus 41. The energization of relay 52 causes closure of its normally open contact 52—1 with stationary contact 54 to "latch" relay 52 into the energized position. In addition thereto, energization of relay 52 causes separation of its normally closed contact 52—2 from its associated stationary contact 56 to disconnect the left-hand power source from the copier machine power cord which is coupled to a suitable wall outlet, for example. Deenergization of the right-hand end of the power conductors stops the copy machine within a time interval which is substantially prior to the time that the document copy can be produced and fed from the machine, but will remain within the machine until appropriate steps are taken to reenergize the machine. It should be noted that deenergization of the copier machine occurs at a moment such that the deenergization will in no way effect its subsequent operation nor will any of the components therein be damaged in any way.

It is now possible through insertion of the key-counter device 13 to reenergize the copier machine as well as adding a count to the machine to indicate the fact that the copy now contained within the machine will be appropriately counted.

Operation of the device with the key-counter inserted is as follows:

Insertion of the key-counter device 13 so that it is connected in the manner shown in FIG. 1 will complete the circuit from terminal 39 of the diode bridge fullwave rectifier through conductor 41, female socket 51a, negative temperature coefficient resistor $R_3$, female socket 45 through the right-hand input to differential relay 44 and resistor $R_2$ to bus 42. A detailed description of the key-counter operation is operation is fully set forth in copending application Ser. No. 537,597 filed Feb. 17, 1966, and assigned to the assignee of the instant invention. For purposes of understanding the instant invention, it is sufficient to understand that the resistivity of the negative temperature coefficient resistance $R_3$ changes as the current surge therethrough moves from zero to its steady state value with the resistance settling to a value sufficient to balance the ampere-turns between windings I and II to cause the differential relay to release the contacts formerly under control of the previously energized winding I in order to effect appropriate operation of the device. Thus the contacts 44—1 and 44—3 are moved to the position as shown in FIG. 1 where they engage their stationary contacts 69 and 70, respectively. Simultaneously therewith the remaining ganged contacts 44—2 and 44—4 move to the disengaged position as shown in FIG. 1, disengaging themselves from their stationary contacts 68 and 53, respectively. The opening of contact 44—4 disables one branch circuit coupled to relay 52. However, relay 52 is still latched in at this time due to energization of its associated contact 52—1.

The closure of relay contact 44—1 energizes differential relay 66 which is a slow-to-close (i.e., delayed pullin) relay so that its associated contacts do not close for a period of approximately 50 milliseconds.

Immediately upon plugging in of key-counter device 13 the conductive path existing for relay solenoid 46 for the master counter through contacts 49 and 47—1 is the same as for the key-counter solenoid 51 causing a count of one to be immediately added to the key-counter. Subsequent to the addition of this pulse the slow-to-operate relay 66 moves its contacts 66—1 and 66—2 into engagement with their associated stationary contacts 75 and 67, respectively. The closure of contact 66—2 establishes a current path for the relay half 47b of polarized relay 47. This is accompanied by the fact that the energization of relay 44 opens contact 44-2 disrupting the current path for polarized relay half 47a. The energization of relay half 47b operates its relay contacts 47—1 through 47—3 in the following manner:

Contact 47—1 is returned to the solid line position as shown in FIG. 1, engaging stationary contact 48. Contact 47—2 is moved to the solid line position as shown in FIG. 1; and contact 47—3 is likewise moved to the solid line position as shown in FIG. 1. Thus, it can be seen that all contact positions disrupt current paths. Contact 47—1 removes current from the counter solenoids 46 and 51, thereby allowing their counter energized springs to advance the counter wheels to reflect the addition of a count of one, since relay contact 34—1 is disengaged from its stationary contact 50. Disengagement of contact 47—2 removes current from the differential relay 66. The disengagement of relay contact 47—3 (when used in the circuit) removes one of the three parallel current paths from the lower terminal of relay 52. However, at this time, the relay 52 nevertheless remains latched in the energized position due to its now closed contact 52—1 in order to return the control circuitry to the state in which the machine being controlled (i.e. the copier machine, for example) is again energized through its power cord. One additional step must now be taken to at least momentarily deenergize relay 52. This may be done, if desired, by removing the plug 19a (see FIG. 3) of the control device 10 from the wall outlet and then replacing it. This operation will be sufficient to deenergize relay 52 causing its relay contact 52—1 to return to its normally open position. Simultaneously therewith the contact 52—2 will return to its normally closed position, thereby restoring power to the copier machine. Since the key-counter is now plugged in, normal operation may take place without any necessity for intermittent stopping and starting of the machine in the manner as was described above.

Another means for momentarily deenergizing relay 52 may take the form of a normally closed pushbutton switch 75 connected in series with relay 52. A momentary depression of the pushbutton to its open position will deenergize the relay causing its contacts 52—1 and 52—2 to move to the normally open and normally closed positions, respectively, in the same manner as was previously described. Release of the pushbutton 75 allows it to return to its normally closed position to permit continued operation of the circuitry in the same manner as was previously described.

Lamp means L is provided in electrical series with relay contact 44—3. The lamp serves the dual function of first indicating the energization of the control device and secondly of indicating the fact that the key-counter has been plugged in. As was previously described, relay contact 44—3 is closed when the key-counter 13 is properly plugged in and conversely, is in the open position when the key-counter has not been properly plugged in. Thus, the lamp L, when not lit, indicates the absence of key-counter 13. If key-counter 13 is plugged in the lamp remains unlit, this indicates either a loss of power or some other fault in the circuitry, thereby providing a troubleshooting function.

Since provision of the pushbutton 75 provides a simple means for deenergizing relay 52 and hence restoring power between wall outlet and copier machine, it is preferable that the pushbutton be located within the control means in a substantially nonobvious location or be positioned behind a key-operated cover or lid so as to prevent unauthorized use of the pushbutton 75.

In order to avoid the necessity for resetting of the control means through the use of pushbutton 75 or any other suitable operation, alternative arrangement for that shown in FIG. 1 may be employed. The alternative arrangement consists simply of the omission of the contacts 44—4, 34—3 and 52—1 contained within the two branch circuits in dotted rectangle 76 and inclusion of contact 47—3 shown in dotted rectangle 76a.

The operation of the control means is as follows:

The absence of the key-counter energizes the half 47a of polarized relay 47 causing it to move its contact 47—3 to the closed position where it engages its associated stationary contact 55. This energizes relay 52 so as to open its normally closed contact 52—2 deenergizing the copier machine. No operation of its contact 52—1 occurs since this contact is completely omitted from the circuitry.

When the key-counter 13 is approximately plugged in, differential relay 66 and relay half 47b become energized while relay half 47a of polarized relay 47 becomes deenergized, causing contact 47—3 to move to the open position there by deenergizing relay 52.

FIG. 2 shows a somewhat simplified circuit for the control device which may be substituted for that shown in FIG. 1. The alternative circuitry of FIG. 2 is employed in devices wherein the surge which occurs during the operative state of the machine has a duration which is sufficient for operation of the relay 34. However, the pulses of such length and the normal ON voltage level of the machine is greater than zero thereby necessitating the provision of a circuit to control operation of the relay at the time when the machine is placed in the operative state. Considering waveform 35 shown in FIG. 4, this waveform represents the waveform obtained in one category of copier machines. As can clearly be seen, when the machine is turned ON at 35a, a slight transient pulse is developed. When the copy producing interval is initiated at 35b, a much sharper pulse develops, which pulse is substantially sustained until 35c. The circuit 30' is designed so as to adjust the exact turn-on time by a selection of a suitable threshold level such as the threshold levels 35d or 35e, as will be more fully described. In this arrangement like components are designated with like numerals shown therein. The surge pickup control circuitry is powered by the same kind of transformer and fullwave rectifier diode bridge. However, in this circuitry a capacitive means $C_4$ is connected in parallel across the adjustable resistor 29. The surge detecting circuit 30' employed therein is comprised of a Zener diode $D_1$ connected in electrical series with relay 34. These series connected elements are coupled in parallel across bus 33 and adjustable arm 29a of adjustable resistor 29. Diode $D_1$ is connected in parallel across relay 34 to prevent reverse polarity current from passing through relay 34.

When the threshold level of the surge pickup control circuit is achieved Zener diode $ZD_1$ will conduct in the direction in which diode $D_1$ is back-biased so that current flow occurs through relay 34 with the current pulse being picked-up at a predetermined level so as to energize the counter stepping relay and hence to advance the counter by a count of one. The Zener diode $ZD_1$ is chosen for the average value of current so that when this value is surpassed the surge pickup control circuit will cause a count of one to be added to the counter. For example, if threshold level 35d is selected, relay 34 will be energized at 35b and deenergized at 35f sustaining energization of relay 34 for a time $t_1$. If threshold level 35e is selected, Zener diode $ZD_1$ will cause relay 34 to become energized at 35b and deenergized at 35g to sustain energization of relay 34 for a duration $t_2$. In any case the Zener diode selected should prevent the relay 34 from becoming energized at the time when the machine is merely turned ON but no copies are being printed. This occurs at a level of 10 volts as shown in FIG. 4. Also the threshold level should be low enough so that the total duration of energization of relay 34 is of a length sufficient to permit the counter to be advanced by one step.

The energization of relay 34 closes its associated normally open relay contacts 34—1 and 34—2. Closure of relay contact 34—1 energizes the master counting solenoid 46 in the same manner as was previously described.

With the key-counter device 13 removed from the circuit differential relay 44 operates in such a way as to close its normally open contact 44—1 and to open its normally closed contact 44—2. Closure of contact 44—1 establishes a current path for relay 52 which latches itself in by closing its normally open contact 52—1 and which cuts power from the copier machine by opening its normally closed contact 52—2. The opening of normally closed contact 44—2 opens a current path for lamp L indicating either that the key-counter 13 has not been properly plugged in or that power has been removed from the circuitry. Upon insertion of the key-counter into its appropriate position relay 44 will now operate so as to move contact 44—2 to their normally closed position and 44—1 to their normally open position. This restores the current path for lamp L, indicating that the key-counter has been plugged in. Movement of contact 44—1 to the open position open circuits only one of the branches for the relay 52. Thus, in order to return contact 52—2 to its normally closed position to permit reenergization of the copier machine, the power circuit to relay 52 must be momentarily disrupted in either of the manners described such as, for example, momentary unplugging of the power cord plug 19a or depression of the normally closed pushbutton which may be provided in series circuit with relay 52. The pushbutton 75 should be mounted inside or otherwise hidden to prevent its unauthorized use. The branch path comprised of contacts 34—2 and 44—1 may be replaced by a branch path 77 containing only contact 44—1. It has been found that the contact 34—2 may be omitted while still providing appropriate operation of the control circuitry. If desired, the same operation may be obtained by reversing contacts 44—1 and 52—2 to be normally closed and normally opened, respectively. While the operation is identical, this reversal of contact states alleviates the need to have power relay 52 energized during periods when the copier machine being controlled is OFF.

In devices that do not have a current surge accompanying initiation of the operative stage, whether they be copier machines, computers or other machines, it is also possible to measure the cost of machine operation by accumulating a count representative of the number of time units elapsed during machine operation. In such devices the circuitry 30' of FIG. 2 (or the circuitry 30 of FIG. 1) may be replaced by a pulsing circuit 78 having its output coupled to relay 34. The pulsing circuit may be coupled directly across the power line leads 20 so as to become energized with energization of the machine. Alternatively, if the turn ON of the machine does not fully place the machine in operation then the pulsing circuit 78 may be coupled to a suitable circuit which becomes energized when the machine is both turned ON and in its operative state. For example, in a copier machine which does not develop a current surge each time a copy is produced or conversely which is capable of reproducing documents of varying lengths in which it is desired to bill according to the total linear length of paper used to produce the copies, the turn ON of the machine does not indicate that copies are being produced. However, as copies are being produced, the light which becomes energized to scan the document being copied, may be used as the circuit to which the pulsing circuit 78 is coupled. Thus, upon energization of the scanning light within the copier machine the pulsing circuit 78 becomes energized to produce pulses at a constant rate so long as the copying operation is being performed. As soon as the scanning light is deenergized pulsing circuit 78 is likewise deenergized. Each pulse developed by pulsing circuit 78 is of sufficient duration to energize relay 34 so as to appropriately add a time unit to the master and key-counter solenoids 46 and 51, respectively. The pulsing circuit 78 may be a free-running multivibrator or any other suitable device capable of generating pulses at a constant rate for the purpose of accumulating time units with in the key-counter device.

As was suggested above the pulsing circuit 78 may be replaced by a synchronous motor means. This embodiment is shown in dotted fashion in FIG. 2 wherein the motor means M is coupled across two of the input leads 20 and is further connected in series with contact 34—3. Thus when the surge of sufficient duration occurs (in the same manner as was previously described) relay 34 will operate closing normally open contact 34—3 as well as operating its other contacts which have been previously described. The closure of contact 34—3 energizes motor means M which is mechanically coupled to operate at least one magnetic member 112, shown in "black box" fashion which, in turn, closes a reed relay identified by the symbol R at a constant predetermined rate during the period in which the machine being so controlled is in actual operation. Each pulse is the equivalent of a predetermined time unit so that the count contained within the master counter and the plug-in counter will reflect time units or billing units to greatly facilitate billing procedures.

Figure 5:
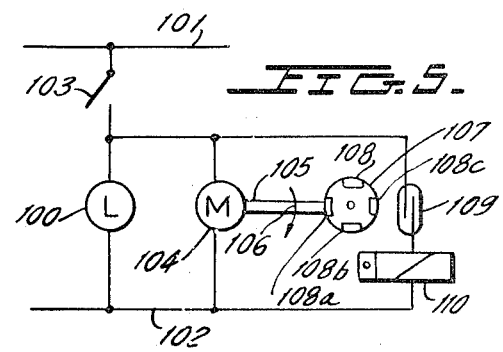
FIG. 5 is a schematic drawing showing an alternative embodiment for the time-unit counting device of FIG. 2.

FIG. 5 shows an alternative arrangement for the counting device of FIG. 2 and is comprised of a scanning lamp means 100, conventionally provided within a copier machine. The scanning lamp 100 is coupled between conductors 101 and 102 which are connected to a suitable source of power. When a copy is made, the scanning lamp 100 is energized by closure of a mechanical, electromechanical, or purely electronic switch, shown in schematic fashion in FIG. 5 as switch means 103. Switch means 103 remains closed for the duration of the scanning operation.

The closure of switch 103 completes an additional current path for a synchronous motor 104 which drives its output shaft 105 into rotation as shown by arrow 106. A suitable disc or cylindrical-shaped member 107, provided with a plurality of permanent magnet members 108—108c is driven into rotation concurrently revolving members 108—108c about the center of disc 107 with the energization of the synchronous motor.

A reed switch 109, of any suitable conventional design, is provided in a third circuit path and is series connected with a time unit counter solenoid 110. The contacts of reed switch 109 are normally open so as to provide an open circuit path for the counter solenoid 110.

When the switch 103 is closed, the scanning light 100 is energized and a current path is provided for the two additional branch circuits of FIG. 5. Energization of the current path containing the motor 104 causes rotation of the permanent magnet members 108—108c which are positioned to move in close proximity to the cooperating contacts of reed switch 109. As each magnet passes in close proximity to the reed switch the normally disengaged contacts are brought into engagement due to the influence of the magnetic field of each permanent magnet causing a circuit closure so as to provide a pulse of sufficient length to energize solenoid counter 110 for the purpose of adding a count to the counter (not shown) operated by the solenoid 110. The synchronous motor 104 is driven at a constant rate so that each of the permanent magnet members, which are preferably arranged at equal intervals of separation around the disc 107, will cause closure of reed switch 109 at a constant rate. By selecting the rotational speed of motor 104 and by selecting the total number of permanent magnets arranged around the periphery of disc 107 any suitable timing interval may be derived. For example, let it be assumed that the synchronous motor completes one revolution every second. By providing four permanent magnet members as shown in FIG. 5, the reed switch 109 will be closed every quarter of a second. Halving the rotational speed of motor 104 or removal of half of the magnets (for example, magnets 108 and 108c) will increase the constant time intervals so as to occur every half second. Obviously any other combination of adjustments may be made. Also, if desired, a speed converter device may be mounted between output shaft 105 and disc 107 to provide still another means for altering the rotational speed and hence the constant time intervals of closure of reed switch 109. If desired, as few as one permanent magnet may be provided along the periphery of disc 107.

Whereas the embodiment of FIG. 5 teaches a permanent magnet assembly influencing a reed switch at a uniform rate, it should be understood that the reed switch 109 and permanent magnet (such as, for example, permanent magnet 108) may be replaced by a normally open mechanical switch and a disc having one or more projections which make sliding engagement with the normally open mechanical switch to close the switch at constant intervals. The permanent magnet and reed switch arrangement is preferred in that a longer operating life can be expected over a purely mechanical switch arrangement.

The arrangement of FIG. 5 thereby provides a simple and yet highly effective means for accumulating elapsed time units of operation to greatly facilitate customer billing. Whereas the arrangement of FIG. 5 has been specifically described for use with copier machines it should be understood that the reed switch and synchronous motor branch circuits may be selectively energized by any other suitable switch operated circuit within a machine, the closure of such switch being coincident with the actual operation of the machine. For example, in a computer the simple turn ON of the computer does not always indicate actual operation of the computer since a certain warm up time may be required. However, the two aforementioned branch circuits may be coupled, for example, with the start button switch of the computer so as to be activated when the computer is actually running a problem.

It can be seen from the foregoing that the instant invention provides a novel electronic circuit which permits the machine to be controlled so as to prevent unauthorized access or use of the machine without insertion of a suitable interlock defeat means or electronic "key" means. The control means may be very simply joined with the machine being controlled due to its unique sensing circuit thereby permitting modification of a machine in a very simple and straightforward manner and which further provides novel cost-control mechanism allowing a simple check to be made between the total of all key-counter readings against the master counter readings while at the same time making it simple to allocate costs amongst the various departments or groups which possess a key-counter device.

Although there has been described a preferred embodiment of this novel invention, many variations and modifications will now be apparent to those skilled in the art. Therefore, this invention is to be limited, not by the specific disclosure herein, but only by the appending claims.

I claim:

1. Means for controlling unauthorized use of a machine which is normally energized by a power source and the machine, said control means being comprised of:
    conductor means capable of being electrically coupled between said power source and said machine;
    first sensing means coupled to said conductor means for sensing initiation of operation of said machine;
    first counter means for counting the number of operations performed by the machine;
    second means coupled to said first sensing means for producing a signal of a duration sufficient to advance the count of said first counter means;
    electronic key means;
    interlock means for removably receiving said electronic key means;
    normally closed switch means connected to said conductor means and being operative to the open position by said interlock means when said electronic key means is not inserted into said interlock means as to remove power from the machine;
    said second means being comprised of first relay means and pulse stretching means for generating a pulse of a duration sufficient to energize said first relay means;
    said first relay means having first and second contact pairs;
    said first counter means being operated by said first contact pair to be advanced by one count upon energization of said first relay means;

said interlock means comprising second relay means having a third contact pair series connected with said second contact pair; said third contact pair being closed when said electronic key means is removed from said interlock means; and third relay means connected in series with said second and third contact pairs and being energized when said machine operation is initiated and said electronic key means is removed from said interlock means to operate said switch means to the open position.

2. The device of claim 1 wherein said third relay means further comprises a fourth normally open contact pair being electrically coupled to said third relay means for "latching" said third relay means in the energized state one once initially energized.

3. The device of claim 2 further comprising fifth means for momentarily deenergizing said third relay means to unlatch said third relay means fourth contact pair.